(12) United States Patent
Kawaguchi et al.

(10) Patent No.: US 11,371,605 B2
(45) Date of Patent: Jun. 28, 2022

(54) CONTROL DEVICE AND CONTROL METHOD FOR AUTOMATIC TRANSMISSION

(71) Applicants: JATCO Ltd, Fuji (JP); NISSAN MOTOR CO., LTD., Yokohama (JP)

(72) Inventors: Takateru Kawaguchi, Fuji (JP); Fumitaka Nagashima, Fuji (JP); Hideharu Yamamoto, Fuji (JP)

(73) Assignees: JATCO LTD., Shizuoka (JP); NISSAN MOTOR CO., LTD., Kanagawa (JP)

( * ) Notice: Subject to any disclaimer, the term of this patent is extended or adjusted under 35 U.S.C. 154(b) by 573 days.

(21) Appl. No.: 16/329,214

(22) PCT Filed: Oct. 17, 2017

(86) PCT No.: PCT/JP2017/037574
§ 371 (c)(1),
(2) Date: Feb. 28, 2019

(87) PCT Pub. No.: WO2018/079349
PCT Pub. Date: May 3, 2018

(65) Prior Publication Data
US 2019/0186629 A1   Jun. 20, 2019

(30) Foreign Application Priority Data

Oct. 31, 2016   (JP) .............................. JP2016-213526

(51) Int. Cl.
*F16H 61/12*     (2010.01)
*F16H 61/16*     (2006.01)
(Continued)

(52) U.S. Cl.
CPC ............. *F16H 61/12* (2013.01); *F16H 61/16* (2013.01); *F16H 61/28* (2013.01); *F16H 63/48* (2013.01);
(Continued)

(58) Field of Classification Search
CPC .......... F16H 61/12; F16H 61/16; F16H 61/28; F16H 63/48; F16H 63/483
See application file for complete search history.

(56) References Cited

U.S. PATENT DOCUMENTS 7,442,149 B2* 10/2008 Lindenschmidt ... F16H 63/3475
477/197
2009/0287383 A1* 11/2009 Fujii ..................... F16H 63/483
701/51
(Continued)

FOREIGN PATENT DOCUMENTS

JP       H03219165 A      9/1991
JP       2013-104463 A    5/2013
(Continued)

OTHER PUBLICATIONS

PCT International Search Report (with English Translation) and Written Opinion (Japanese Language only) in corresponding International Application No. PCT/JP2017/037574 dated Jan. 23, 2018.

*Primary Examiner* — Tinh Dang
(74) *Attorney, Agent, or Firm* — Foley & Lardner LLP

(57) ABSTRACT

A control device for automatic transmission of the present invention includes a transmission mechanism and a park lock device. The park lock device has a rod member and a lock mechanism. The lock mechanism restricts movement of the rod member when being in a locked state. If a CPU reset (reset of a CPU constituting an ATCU) occurs, the control device maintains the locked state of the lock mechanism after a return from the CPU reset.

5 Claims, 4 Drawing Sheets

(51) Int. Cl.
   *F16H 63/48*   (2006.01)
   *F16H 61/28*   (2006.01)
   *F16H 63/34*   (2006.01)
   *F16H 59/68*   (2006.01)
   *F16H 61/22*   (2006.01)

(52) U.S. Cl.
   CPC ........... *F16H 63/483* (2013.01); *F16H 59/68* (2013.01); *F16H 63/3416* (2013.01); *F16H 63/3475* (2013.01); *F16H 63/3491* (2013.01); *F16H 2061/1268* (2013.01); *F16H 2061/223* (2013.01); *F16H 2312/12* (2013.01)

(56) References Cited

U.S. PATENT DOCUMENTS

2013/0252785 A1    9/2013   Kinoshita et al.
2019/0165602 A1*   5/2019   Morita .................... F16H 61/28

FOREIGN PATENT DOCUMENTS

JP    2013199963 A    10/2013
JP    5733165 B2    6/2015

* cited by examiner

CONTROL DEVICE AND CONTROL METHOD FOR AUTOMATIC TRANSMISSION

CROSS-REFERENCE TO RELATED APPLICATIONS

This application is a National Phase of International Patent Application No. PCT/JP2017/037574 filed on Oct. 17, 2017, which claims priority to Japanese Patent Application No. 2016-213526 filed on Oct. 31, 2016. The contents of these applications are herein incorporated by reference in their entirety.

TECHNICAL FIELD

The present invention relates to a control device and a control method for automatic transmission with a park lock device of a shift-by-wire type.

BACKGROUND ART

A park lock device of a shift-by-wire type is known, which performs switching between a park locked state and a park unlocked state by an actuator according to a shifting operation of a driver. Specifically, the shifting operation of the driver is detected, the actuator is actuated according to the detected shifting operation, and the park lock device is set to the park locked state or park unlocked state. The operation of the actuator according to the shifting operation is controlled by a controller with a CPU.

JP5733165B disclose a control device for automatic transmission with a park lock device, in which a shift range after a return from a CPU reset is set to the one other than a P-range (parking range) (specifically, the shift range before the CPU reset) if the CPU reset occurs during travel at a medium or high vehicle speed, whereas the shift range after a return from a CPU reset is set to the P-range if the CPU reset occurs during travel at a low vehicle speed (paragraph 0010). In JP5733165B, a drop of power supply voltage is cited as a cause for the CPU reset.

SUMMARY OF INVENTION

However, in JP5733165B, since the shift range after the return from the CPU reset is constantly set to the P-range during travel at the low vehicle speed, the following problems occur due to the setting of the park lock device to the park locked state.

Firstly, since the shift range after the return is set to the P-range even if the shift range before the CPU reset is an N-range (neutral range), the park lock device may be unintentionally switched to the park locked state according to the return from the CPU reset to hinder smooth travel and generate abnormal noise, if the CPU reset occurs during towing at a low speed.

Secondly, the CPU reset occurs not only due to a drop of the power supply voltage, but also due to the self-judgment of the CPU when a CPU error occurs. In the case of the reset due to the CPU error, the shift range stored in the CPU as the one before the CPU reset is not necessarily sufficiently reliable. The shift range stored in the CPU having experienced the error is conceivably wrong.

For example, if a reset occurs due to a CPU error despite the fact that a vehicle is being parked in an R-range (reverse range) in a garage, it is concerned that park lock is activated by setting the shift range after a return is the P-range, and sudden braking occurs.

In view of the above problems, it is an object of the present invention to more properly actuate a park lock device at the time of a return from a CPU reset.

In one aspect of the present invention, a control device for an automatic transmission is provided, which automatic transmission includes a transmission mechanism, and a park lock device having a rod member and a lock mechanism configured to restrict a movement of the rod member when being in a locked state. The control device of this embodiment maintains the locked state of the lock mechanism after a return from a CPU reset, if the CPU reset occurs in the control device when the lock mechanism is in the locked state.

In another aspect of the present invention, a control method for an automatic transmission is provided, which automatic transmission includes a transmission mechanism, and a park lock device having a rod member and a lock mechanism configured to restrict a movement of the rod member when being in a locked state. The control method of this embodiment maintains the locked state of the lock mechanism after a return from a CPU reset, if the CPU reset occurs in the control device when the lock mechanism is in the locked state.

According to the above aspects, when the CPU reset occurs, reliability for the state of the park lock device after the return can be improved.

DESCRIPTION OF EMBODIMENT

Hereinafter, an embodiment of the present invention is described with reference to the drawings.

(Configuration of Vehicle Drive System)

Figure 1:
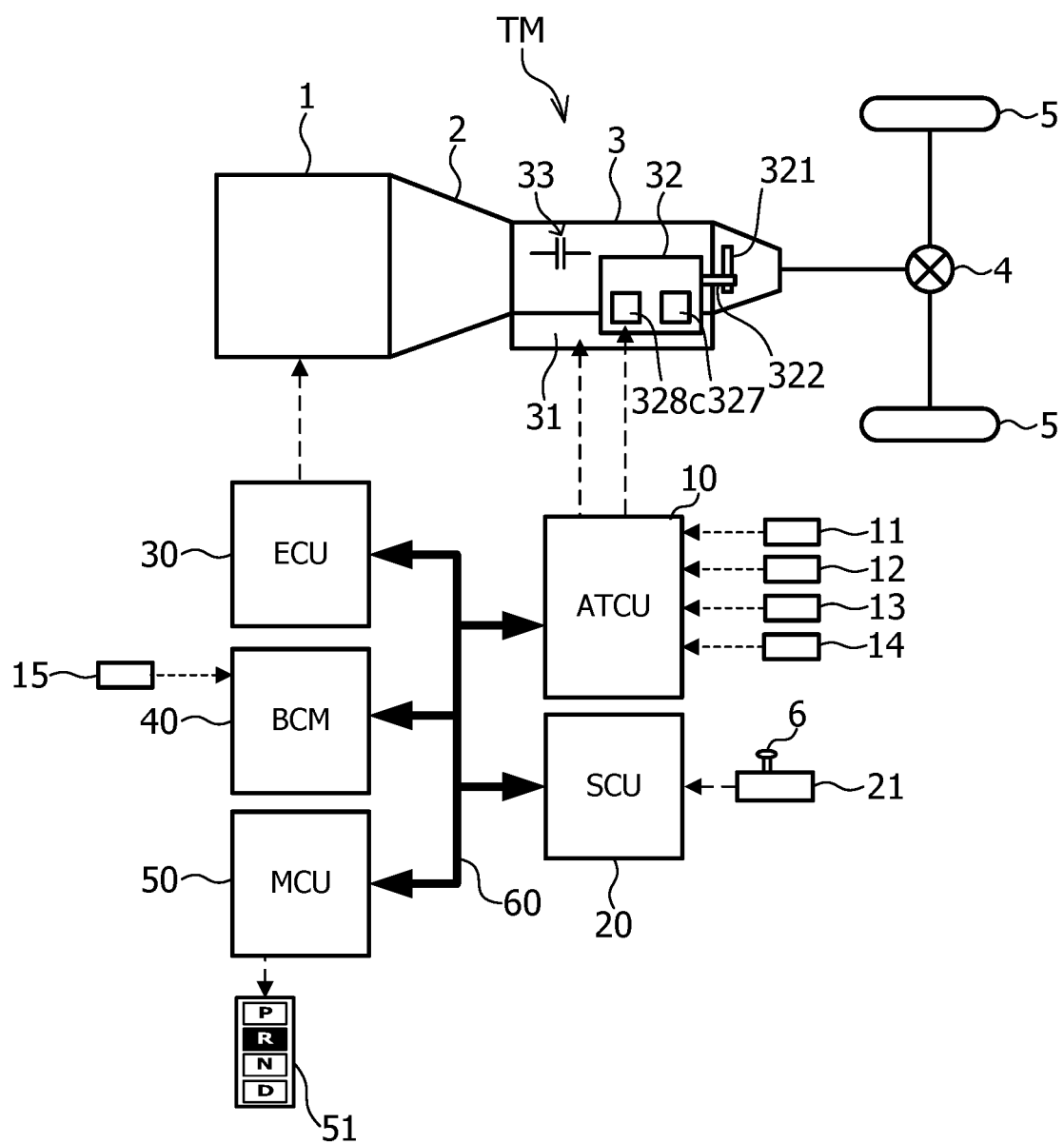
FIG. 1 is a configuration diagram schematically showing a vehicle drive system according to one embodiment of the present invention.

FIG. 1 schematically shows an overall configuration of a vehicle drive system according to one embodiment of the present invention.

A vehicle according to the present embodiment includes an internal combustion engine (hereinafter, merely referred to as an "engine") 1 as a drive source, and power of the engine 1 is transmitted to left and right drive wheels 5, 5 via a torque converter 2, a transmission mechanism 3 and a differential device 4. The torque converter 2 and the transmission mechanism 3 constitute a transmission TM of the vehicle, and the operation of the transmission TM is controlled by an automatic transmission control unit (ATCU) 10.

In the transmission TM, a drive range (hereinafter, referred to as a "D-range"), a reverse range (hereinafter, referred to as an "R-range"), a neutral range (hereinafter, referred to as an "N-range") and a parking range (hereinafter, referred to as a "P-range") are set as shift ranges. The D-range and the R-range are equivalent to travel ranges and the N-range and the P-range correspond to non-travel ranges.

The shift range of the transmission TM is selected by a driver using a shift lever 6. The shift lever 6 constitutes a shift instructing device. The form of the shift lever 6 is not particularly limited. A momentary type shift lever which automatically returns to a neutral position thereof after the shifting operation can be illustrated as the shift lever 6 applicable to the present embodiment.

The transmission mechanism 3 is a stepped automatic transmission, and includes a planetary gear mechanism, which is not shown in the figure, and a plurality of friction engaging elements 33. The friction engaging elements 33 include clutches and a brake, and gear positions including a plurality of forward gear positions and one reverse gear position are achieved by changing an engagement/disengagement combination of the friction engaging elements 33 to switch a gear ratio via the planetary gear mechanism.

The transmission mechanism 3 further includes a control valve unit 31 and a park module 32. The control valve unit 31 includes a plurality of solenoids for controlling working hydraulic pressures of the friction engaging elements 33 provided in the transmission mechanism 3, and the park module 32 mechanically engages an output shaft of the transmission mechanism 3 to hinder the rotation of the output shaft when the shift range of the transmission TM is the R-range.

(Configuration of Control System)

A signal from a vehicle speed sensor 11 for detecting a vehicle speed VSP, a signal from an oil temperature sensor 12 for detecting an oil temperature $T_{OIL}$ of the transmission TM and signals from a parking position sensor 13 for detecting the position of a drive member (park rod 323) of the park module 32, a road gradient sensor 14 for detecting a gradient of a road on which the vehicle is located and the like are input as various detection signals indicating a driving state of the vehicle to the ATCU 10. In the present embodiment, the parking position sensor 13 is a stroke sensor.

In addition to the above signals, signals from a Shift Control Unit (SCU) 20, an Engine Control Unit (ECU) 30, a Body Control Module (BCM) 40 and a Meter Control Unit (MCU) 50 are input to the ATCU 10. The ATCU 10 and these various control units 20, 30, 40 and 50 are mutually communicably connected via a bus 60 of CAN (Control Area Network) standards. Each of the ATCU 10, the SCU 20, the ECU 30, the BCU 40 and the MCU 50 is in the form of an electronic control unit, and includes storage devices such as a ROM and a RAM and an input/output interface besides a Central Processing Unit (CPU).

The SCU 20 is a shift control unit, and generates a required range signal corresponding to the position of the shift lever 6. The SCU 20 generates the required range signal corresponding to the selected range on the basis of a selected range signal, which is a signal from a selected range detection switch 21, and outputs the generated signal to the ATCU 10.

Then, the ATCU 10 sets the shift range of the transmission TM on the basis of the required range signal from the SCU 20, and outputs a control command value corresponding to the shift range to the control valve unit 31.

Specifically, if the D-range is selected by the driver, a target gear position is determined from a shift map on the basis of the vehicle speed VSP, and an accelerator pedal opening APO and a control command value for achieving the target gear position is calculated and output to the control valve unit 31. If the plurality of solenoids are controlled according to the control command value in this way, the working hydraulic pressures of the friction engaging elements 33 are adjusted, and the target gear position is achieved. On the other hand, if the R-range is selected, the target gear position is determined to be a reverse gear position, and a control command value for achieving the target gear position is output to the control valve unit 31. If the other. P-range and N-range are selected, all or some of the friction engaging elements 33 are disengaged, and a control command value for setting a neutral state where power transmission between input and output shafts of the transmission TM is cut off is output to the control valve unit 31.

Here, the ATCU 10 controls the park module 32 when the selected range is changed between the P-range and the shift range other than the P-range. In this way, the park lock is executed or the park locked state is released.

The ECU 30 is an engine control unit, and controls outputs (torque and rotation speed) of the engine 1. The ECU 30 calculates a rotation speed NE of the engine 1, an accelerator pedal operated amount APO and the like from detection signals of unillustrated rotation speed sensor and accelerator sensor as the driving state, and outputs the calculated quantities to the ATCU 10. The accelerator pedal operated amount APO indicates an operated amount of an accelerator pedal by the driver.

The BCM 40 is a body control module, and controls a vehicle-side operating element. The vehicle-side operating element is, for example, a door lock mechanism of the vehicle or an ignition switch of the engine 1. The BCM 40 outputs an on/off signal of a door lock switch for detecting a door locked state of the vehicle, an on/off signal of the ignition switch 15 of the engine 1 or the like to the ATCU 10.

The MCU 50 is a meter control unit, and controls indicators such as meters, warning lamps and displays provided in a vehicle interior. These indicators include a range indicator 51 for displaying e current shift range of the transmission TM. Further, the indicators may include alarms urging auditory recognition without being limited to those to be visually recognized.

(Configuration of Park Module)

Figure 2:
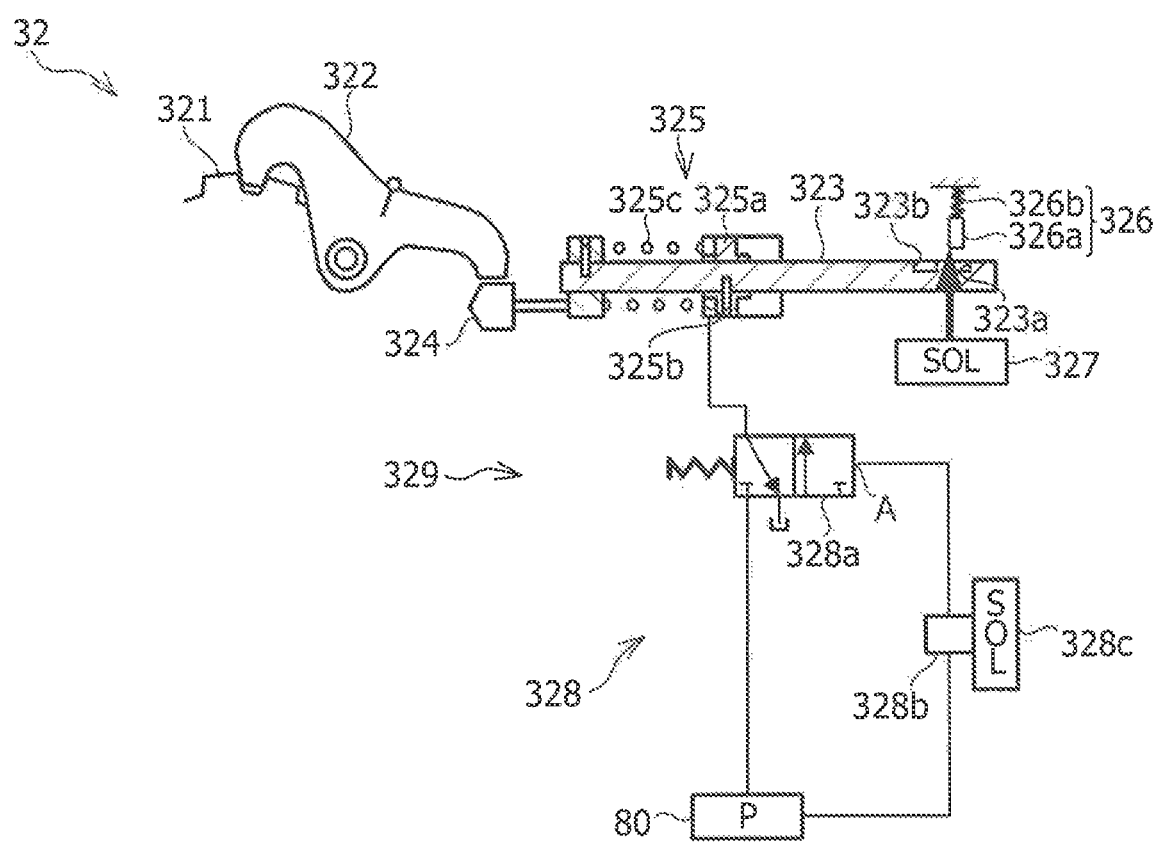
FIG. 2 is a diagram schematically showing a state during park locking of a park module provided in the vehicle drive system.
Figure 3:
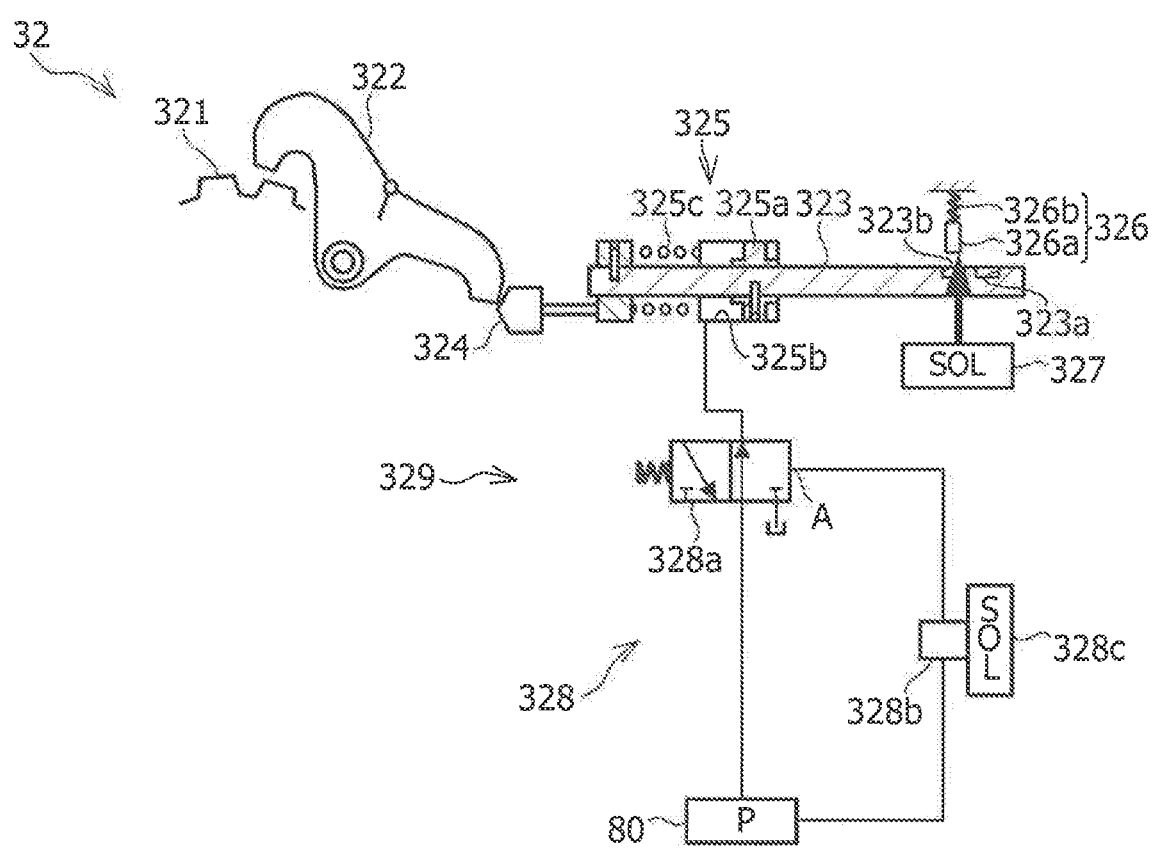
FIG. 3 is a diagram schematically showing a state during park unlocking of the park module provided in the vehicle drive system.

FIGS. 2 and 3 schematically show the operation of the park module 32 provided in the vehicle drive system according to the present embodiment, wherein FIG. 2 shows a state during park locking of the park module 32 (park locked state), and FIG. 3 shows a state during park unlocking of the park module 32 (park unlocked state) respectively. The park module 32 constitutes a "park lock device" of the automatic transmission.

The park module 32 includes a parking gear 321, a parking pole 322, the park rod 323, a pole drive cam 324, a park actuator 325, a lock mechanism 326, a first actuator unit 327 and a second actuator unit 328. The park rod 323 constitutes a "rod member" of the park lock device. The park module 32 further includes a hydraulic unit 80.

The hydraulic unit 80 is a line pressure system having a line pressure of the transmission mechanism 3 as a hydraulic pressure P, and includes a line pressure adjusting valve for adjusting the line pressure besides a line pressure oil passage. The hydraulic unit 80 may further include an oil pump for supplying oil to the line pressure oil passage. The hydraulic unit 80 can be disposed in the control valve unit 31, and similarly, a switching valve 328a, a control valve 328b and a solenoid 328c can also be disposed in the control valve unit 31.

The parking gear 321 is fixed to the output shaft of the transmission mechanism 3 concentrically with the output shaft, and rotates or stops together with the output shaft. Recesses are formed at equal intervals over the entire circumference on the outer periphery of the parking gear 321, and a hook part formed on the tip of the parking pole 322 engages these recesses.

The parking pole 322 swings in conjunction with the park rod 323. If the parking pole 322 swings, the tip hook part of the parking pole 322 engages the recess of the parking gear 321 (expressed by "the parking pole engages the parking gear" below for the convenience of description) or this engaged state is released. The parking pole 322 engages the parking gear 321, whereby the park module 32 is set to the "park locked state" (FIG. 2), and the free rotation of the output shaft of the transmission mechanism 3 is hindered to restrict a movement of the vehicle. On the other hand, if the tip hook part is disengaged from the recess to release the engaged state of the parking gear 321 and the parking pole 322, the park module 32 is set to the "park unlocked state" (FIG. 3), and the free rotation of the output shaft of the transmission mechanism 3 is allowed to release the movement restriction of the vehicle.

The park rod 323 doubles as a movable member of the park actuator 325, and is set to have a length to be projected from both sides of the park actuator 325 in an actuating direction of the park actuator 325. The park rod 323 is driven by the park actuator 325, and selectively arranged at a park locking position shown in FIG. 2 and a park unlocking position shown in FIG. 3.

The pole drive cam 324 is mounted on one end side of the park rod 323. A first engaging portion 323a and a second engaging portion 323b to be engaged with the lock mechanism 326 (specifically, hook 326a of the lock mechanism 326) are provided on the other end side of the park rod 323. The first engaging portion 323a is an engaging portion to be engaged with the lock mechanism 326 when the park rod 323 is at the "park locking position" shown in FIG. 2, and the second engaging portion 323b is an engaging portion to be engaged with the lock mechanism 326 when the park rod 323 is at the "park unlocking position" shown in FIG. 3. In the present embodiment, the both first and second engaging portions 323a, 323b are in the form of recesses continuously formed along the entire circumference on the outer periphery of the park rod 323. The first and second engaging portions 323a, 323b need not necessarily be formed over the entire circumference as long as the lock mechanism 326 is engageable and, further, a relationship between the first and second engaging portions 323a, 323b and the lock mechanism 326 (hook 326a) is not limited to such a relationship that the formers are of a female type and the latter is of a male type. For example, the first and second engaging portions 323a, 323b may be formed by projections projecting from the outer periphery of the park rod 323.

The pole drive cam 324 comes into contact with the parking pole 322, and interlocks with the park rod 323 to swing the parking pole 322. The pole drive cam 324 engages the parking gear 321 and the parking pole 322 when the park rod 323 is at the park locking position, and separates the parking pole 322 from the parking gear 321 to disengage the both when the park rod 323 is at the park unlocking position.

The park actuator 325 is a hydraulic actuator, and drives the park rod 323. The park actuator 325 moves the park rod 323 to the park locking position when the P-range is selected, and moves the park rod 323 to the park unlocking position when the shift range other than the P-range is selected.

In the present embodiment, the park actuator 325 is in the form of a hydraulic cylinder, and includes a piston 325a, a cylinder 325b and a return spring 325c. The cylinder 325b is internally formed with a hydraulic chamber, the piston 325a is housed in this hydraulic chamber, and the hydraulic chamber is partitioned into two front and rear chambers in the actuating direction by the piston 325a. The park rod 323 is fixed in a state penetrating through a central part of the piston 325b. The hydraulic pressure P is supplied into the hydraulic chamber of the cylinder 325b from the hydraulic unit 80 via the switching valve 328a. In the present embodiment, the hydraulic pressure P is supplied into a front hydraulic chamber part in the actuating direction. The return spring 325c is interposed in a compressed state between the park rod 323 and the cylinder 325b, and biases the park rod 323 forward along the actuating direction, in other words, toward the park locking position.

The lock mechanism 326 fixes a state of the park module 32 depending on whether the park module 32 is in the park locked state where the park rod 323 is at the park locking position (FIG. 2) or in the park unlocked state where the park rod 323 is at the park unlock position (FIG. 3). The lock mechanism 326 restrains a movement of the park rod 323, and mechanically fixes the park rod 323 by being engaged with the park rod 323.

Specifically, the lock mechanism 326 includes the hook 326a and a spring 326b, and the hook 326a is engaged with the park rod 323. The hook 326a is inserted into the first or second engaging portion 323a, 323b of the park rod 323, whereby the hook 326a is locked to the first or second engaging portion 323a, 323b, and the lock mechanism 326 is engaged with the park rod 323. The spring 326b biases the hook 326a in a direction to approach the park rod 323, in other words, in such a direction that the hook 326a is locked to the first or second engaging portion 323a, 323b. In the present embodiment, a state where the park rod 323 is at the park locking position and the hook 326a of the lock mechanism 326 is locked to the first engaging portion 323a is assumed as the park locked state, and a state where the park rod 323 is at the park unlocking position and the hook 326a of the lock mechanism 326 is locked to the second engaging portion 323b is assumed as the park unlocked state.

The first actuator unit 327 unlocks the lock mechanism 326. The first actuator unit 327 is constituted by a solenoid, and acts in an unlocking direction on the hook 326a to separate the hook 326a from the first or second engaging portion 323a, 323b and unlock the lock mechanism 326 as shown in FIGS. 2 and 3 when being energized by having power supplied thereto.

The second actuator unit 328 is composed of the switching valve 328a, the control valve 328b and the solenoid 328c.

The switching valve 328a selectively supplies the hydraulic pressure P to the park actuator 325 (cylinder 325b) from the hydraulic unit 80. In the present embodiment, the switching valve 328a is a spool-type valve device, and includes a port A which is a pilot port. The port A is connected to the hydraulic unit 80 via the control valve 328b, and a spring for biasing a valve body of the switching valve 328a toward the port A is disposed on a side of the switching valve 328a opposite to the port A. The control valve 328b controls the hydraulic pressure to be supplied to the port A. The solenoid 328c is a linear solenoid, and drives the control valve 328b on the basis of a command from the ATCU 10. A force acting on the valve body of the switching valve 328a from the side of the port A is changed by the control valve 328b.

If the force acting on the valve body of the switching valve 328a from the side of the port A is smaller than a force of the spring acting from the opposite side, communication between the hydraulic unit 80 and the cylinder 325b of the park actuator 325 is blocked by the switching valve 328a as shown in FIG. 2. In this case, the cylinder 325b and an oil tank (shown in simplified figures in FIGS. 2 and 3) communicate via the switching valve 328a, and the oil in the hydraulic chamber is returned to the oil tank to drain the cylinder 325b. In this way, the park rod 323 is moved toward the park locking position by an elastic force of the return spring 325c. After the park rod 323 reaches the park locking position, energization to the first actuator unit 327 is stopped, whereby the hook 326a is engaged with the first engaging portion 323a, and the lock mechanism 326 is locked.

In contrast, if the force acting on the valve body of the switching valve 328a from the side of the port A is larger than the force of the spring acting from the opposite side, the hydraulic unit 80 and the cylinder 325b of the park actuator 325 communicate via the switching valve 328a as shown in FIG. 3. In this way, the hydraulic pressure P is supplied into the hydraulic chamber, and the park rod 323 moves toward the park unlocking position against the elastic force of the return spring 325c. When the park rod 323 reaches the park unlocking position, energization to the first actuator unit 327 is stopped, whereby the hook 326a is engaged with the second engaging portion 323b, and the lock mechanism 326 is locked.

In the park module 32, the swing valve 328a, the control valve 328b, the solenoid 328c and the hydraulic unit 80 constitute a hydraulic control unit 329 for controlling the hydraulic pressure for moving the park rod 323. It is also possible to integrate the hydraulic control unit 329 and the park actuator 325.

(Contents of Reset Return Control)

In the present embodiment, if the CPU constituting the ATCU 10 is reset (hereinafter, referred to as a "CPU reset"), the following reset return control is executed at the time of a return thereafter in addition to a basic control of the park lock device 32 described above.

The CPU reset occurs, such as when a power supply voltage of the ATCU 10 temporarily drops (including the case of instantaneously occurring power supply cutoff) and when an error occurs in the CPU. The former CPU reset is an accidental reset without depending on the intention of the CPU, and the latter CPU reset is an intentional reset by the CPU.

Figure 4:
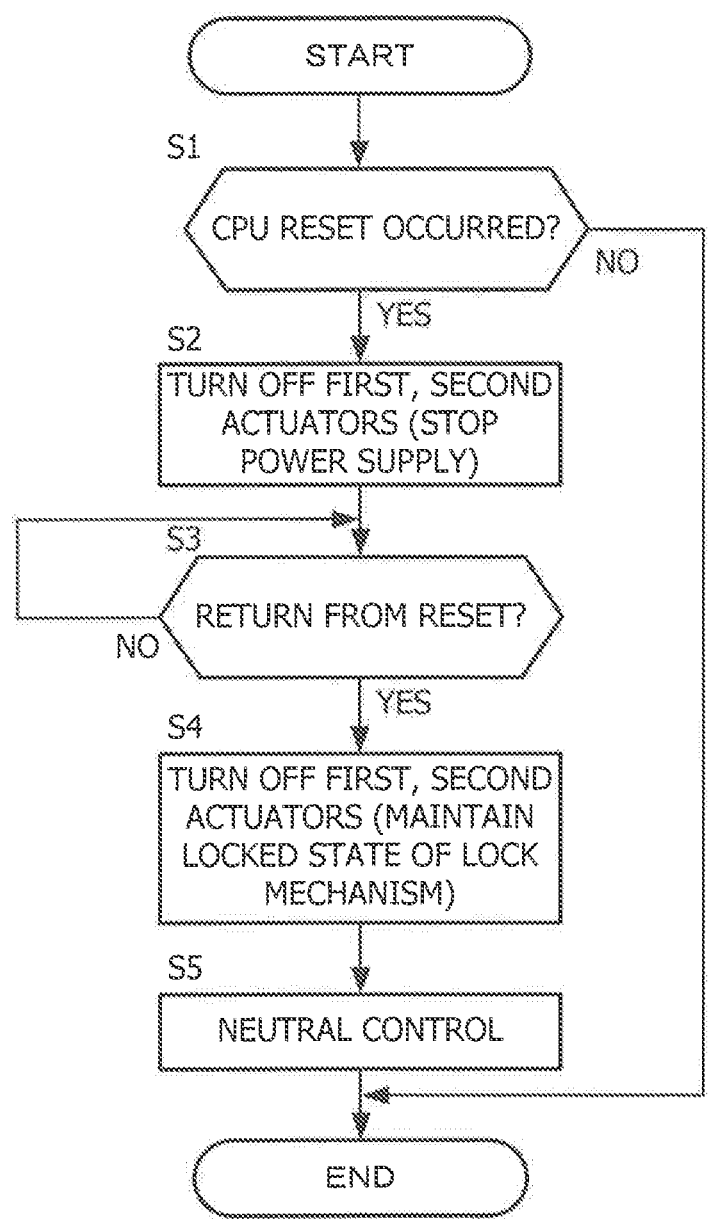
FIG. 4 is a flow chart showing a basic flow of a return control after a CPU reset (reset return control) according to the one embodiment of the present invention.

FIG. 4 shows a basic flow of the reset return control by a flow chart.

In S1, it is determined whether or not a CPU reset has occurred. The CPU reset is executed by the ATCU 10 itself, for example, when some error is caused in the CPU by the ATCU 10. A known determination method can be applied to determine whether or not any error has occurred in the CPU. If an error has occurred in the CPU, it is judged that the CPU reset has occurred, and advance is made to S2. If no CPU reset has occurred, the control is ended.

In S2, in response to the determination that an error has occurred in the CPU, the power supply is cut off after a predetermined backup process is performed. In this way, the supply of power to the solenoid serving as the first actuator unit 327, and the solenoid 328c of the second actuator unit 328 is stopped. By stopping the supply of power to the first actuator unit 327, the lock mechanism is locked.

In S3, it is determined whether or not a return has been made from the CPU reset. For example, if the ATCU 10 is powered on again after the power supply is cut off for the CPU reset, it is determined that a return has been made from the CPU reset. Advance is made to S4 in the case of the return from the CPU reset, otherwise it is waited until the return is made.

In S4, the lock mechanism 326 is maintained in the locked state. In the present embodiment, an instruction to maintain the locked state of the lock mechanism 326 is output to the first actuator unit 327. Specifically, the supply of power to the solenoid serving as the first actuator unit 327, and the solenoid 328c of the second actuator unit 328 continues to be stopped. After the return from the CPU reset, a state where energization to the first and second actuator units 327, 328 is stopped is maintained until a change of the shift range is instructed on the basis of a shifting operation of the driver. In other words, if a change of the shift range by the driver is confirmed, energization to the first and second actuator units 327, 328 is allowed.

In this way, if the CPU reset occurs in a state where the hook 326a of the lock mechanism 326 is engaged with the first engaging portion 323a of the park rod 323 when the park rod 323 is at the park locking position (FIG. 2), the state where the hook 326a is engaged with the first engaging portion 323a is maintained also after the return from the CPU reset. On the other hand, if the park rod 323 is at the park unlocking position (FIG. 3) before the CPU reset and the CPU reset occurs in a state where the hook 326a is engaged with the second engaging portion 323b of the park rod 323, the state where the hook 326a is engaged with the second engaging portion 323b is maintained also after the return. As just described, the locked state of the lock mechanism 326 is maintained also after the return from the CPU reset, thereby maintaining the state (park locked state or park unlocked state) of the park lock device 32 before the CPU reset regardless of the vehicle speed.

In the present embodiment, the cylinder 325b of the park actuator 325 is drained if the supply of power to the solenoid 328c of the second actuator unit 328 is cut off by the CPU reset. Thus, the park rod 323 is automatically moved to the park locking position by the return spring 325c. Accordingly, if the locked state of the lock mechanism 326 was released before the CPU reset, the park rod 323 is at the park locking position at the time of the return. Thus, only by stopping energization to the first actuator unit 327 on the basis of an instruction to set the locked state, the lock mechanism 326 is locked, and the park locked state is set.

In S5, all or some of the friction engaging elements 33 constituting the transmission mechanism 3 are disengaged to set the transmission mechanism 3 to the neutral state, and cut off power transmission via the transmission mechanism 3.

Although the CPU of the ATCU 10 is intentionally reset in the event of a CPU error in the present embodiment, the CPU reset is not limited to this, and possibly occurs also when the supply of power to the ATCU 10 is accidently cut off. Also in this case, an instruction to maintain the locked state of the lock mechanism 326 is output to the first actuator unit 327 upon turning on the power supply again, whereby the lock mechanism 326 is maintained in the locked state.

Further, in the present embodiment, both the hydraulic pressure and the elastic force of the spring are used to drive the park rod 323. However, in the case of adopting, for example, a configuration for moving the park rod 323 forward and rearward by an actuator as a configuration not depending on any spring, an instruction to move the park rod 323 to the park locking position is output to the actuator at the time of a return from a CPU reset, and thereafter an instruction to set the locked state is output to the lock mechanism 326.

(Description of Functions and Effects)

The park lock device 32 and the control device (ATCU 10) for automatic transmission according to the present embodiment are configured as described above. Effects obtained by the present embodiment are summarized below.

Firstly, if a CPU reset occurs in the ATCU 10, reliability for the state of the park lock device (park module 32 in the present embodiment) after a return can be improved. The locked state of the lock mechanism 326 is maintained also after the return from the CPU reset, and a movement of the park rod 323 accompanied by a state change of the park lock device 32 is restricted, whereby it can be avoided that the park lock device 32 is switched from the park unlocked state to the park locked state due to some cause, to hinder smooth travel or generate abnormal noise at the time of a return, for example, after the occurrence of a CPU reset during low-speed towing in the N-range or during parking in a garage in the R-range.

Secondly, by setting the transmission mechanism 3 to the neutral state after the return from the CPU reset, safety after the return can be enhanced. For example, if a CPU reset occurs during parking in a garage in the R-range, sudden braking due to erroneous setting of the shift range to the P-range after the return can be avoided. Further, a situation of reverse rotation caused by the occurrence of a CPU reset during travel in the D-range, and erroneous setting of the R-range after a return can be avoided. If the transmission mechanism 3 is set to the neutral state, coasting by inertia is possible.

Thirdly, by setting the park lock device 32 to the park locked state at the time of a return when a CPU reset occurs with the locked state of the lock mechanism 326 released, reliability after the return can be further enhanced. If a CPU reset occurs while the shift range is being changed from the P-range to the one other than the P-range, it is sufficient to set the shift range, to which shifting was to be made, again after a return. Thus, a burden or a sense of incongruity given to the driver is reduced. On the other hand, if the shift range is being changed from the one other than the P-range to the P-range, the setting of the park locked state after the return is nothing but a switch according to the intention of the driver.

Although the embodiment of the present invention has been described above, the present invention is not limited to this and it goes without saying that various changes and modifications can be made within the scope of matters described in claims.

For example, the transmission mechanism 3 constituting the transmission TM needs not be a stepped transmission mechanism, and may be a continuously variable transmission mechanism.

The present application claims a priority of Japanese Patent Application No. 2016-213526 filed with the Japan Patent Office on Oct. 31, 2016, and the entire contents of which are hereby incorporated by reference.

The invention claimed is:

1. A controller for an automatic transmission, the automatic transmission including:
   a transmission mechanism; and
   a park lock device including a rod member, and a lock mechanism configured to restrict a movement of the rod member when being in a locked state,
   wherein the controller is configured to maintain a state of the park lock device in the same state before a CPU (Central Processing Unit) reset and after a return from the CPU reset, regardless of a vehicle speed before the CPU reset, if the CPU reset occurs in the controller when the lock mechanism is in the locked state.

2. The controller according to claim 1, further configured to set the transmission mechanism to a neutral state at the time of the return after the CPU reset.

3. The controller according to claim 1, further configured to set the park lock device to a park locked state at the time of the return after the CPU reset, if the CPU reset occurs when the lock mechanism is in an unlocked state.

4. A control method for an automatic transmission, the automatic transmission including:
   a transmission mechanism; and
   a park lock device including a rod member, and a lock mechanism configured to restrict a movement of the rod member when being in a locked state, the method comprising:
   maintaining a state of the park lock device in the same state before a CPU (Central Processing Unit) reset and after a return from the CPU reset, regardless of a vehicle speed before the CPU reset, if the CPU reset occurs in the when the lock mechanism is in the locked state.

5. A control device for an automatic transmission, the automatic transmission including a transmission mechanism and a park lock device, the park lock device including a rod member, and a lock mechanism configured to restrict a movement of the rod member when being in a locked state, the control device comprising:
   means for determining whether a CPU (Central Processing Unit) reset occurs in the control device when the lock mechanism is in the locked state; and
   means for controlling a state of the park lock device such that the state of the park lock device is maintained in the same state before the CPU reset and after a return from the CPU reset, regardless of a vehicle speed before the CPU reset, if the CPU reset occurs in the when the lock mechanism is in the locked state.

\* \* \* \* \*